United States Patent [19]

Klotz et al.

[11] 4,126,515
[45] Nov. 21, 1978

[54] NUCLEAR REACTOR CAVITY STREAMING SHIELD

[75] Inventors: Robert J. Klotz, Simsbury; Donald W. Stephen, West Suffield, both of Conn.

[73] Assignee: Combustion Engineering, Inc., Windsor, Conn.

[21] Appl. No.: 792,164

[22] Filed: Apr. 29, 1977

[51] Int. Cl.² ............................................. G21C 13/00
[52] U.S. Cl. ................................. 176/87; 176/DIG. 2
[58] Field of Search ............................ 176/87, DIG. 2

[56] References Cited

U.S. PATENT DOCUMENTS

| | | | |
|---|---|---|---|
| 2,921,007 | 1/1960 | Spinrad | 176/DIG. 2 |
| 3,108,052 | 10/1963 | Stathoplos et al. | 176/DIG. 2 |
| 3,159,550 | 12/1964 | Laming | 176/DIG. 2 |
| 3,216,902 | 11/1965 | Costes et al. | 176/DIG. 2 |
| 3,884,839 | 5/1975 | Bon et al. | 176/DIG. 2 |
| 3,945,887 | 3/1976 | Lemercier | 176/DIG. 2 |

FOREIGN PATENT DOCUMENTS 1,340,500  1/1962  France ............................. 176/DIG. 2

*Primary Examiner*—Peter A. Nelson
*Attorney, Agent, or Firm*—Arthur L. Wade

[57] ABSTRACT

The upper portion of a nuclear reactor vessel supported in a concrete reactor cavity has a structure mounted below the top of the vessel between the outer vessel wall and the reactor cavity wall which contains hydrogenuous material which will attenuate radiation streaming upward between vessel and the reactor cavity wall while preventing pressure buildup during a loss of coolant accident.

9 Claims, 2 Drawing Figures

NUCLEAR REACTOR CAVITY STREAMING SHIELD

BACKGROUND OF THE INVENTION

1. Field of the Invention

The present invention relates to a nuclear reactor cavity radiation streaming shield which is mounted near the top of the reactor pressure vessel so as to continuously attenuate radiation streaming up the annulus between the external wall of the pressure vessel and the reactor cavity wall while preventing pressure buildup after a loss of coolant accident. More particularly the invention relates to a radiation shield which is porous to vapor escaping from a reactor following a loss of coolant accident (LOCA) and which continuously attenuates the gamma and neutron radiation from the reactor.

2. Description of the Prior Art

At page 111 of the August 1976 issue of Nuclear News, the advertisement of Permali, Inc., Mount Pleasant, Pa. 15111 provides an excellent example of the status of the present art.

"With the existence of a large annulus between reactor vessel and primary containment shield wall in many pressurized water reactors (PWRs), an unacceptably high dose rate of neutrons can occur due to scattering or streaming. By the utilization of a Permali shield collar at the elevation of the reactor vessel head, however, such neutron streaming can be held within permissible limits.

Constructed of an efficient composite of both neutron-attenuating Permali NH and boronated/neutron-capturing Permali JN phenolic-impregnated densified laminates, shield collars can be fabricated to extremely precise tolerances. In addition, the Permali collars are manufactured in large segments to facilitate their removal during refueling."

The key phrase of this statement is, "By the utilization of a Permali shield collar at the elevation of the reactor vessel head . . ." It is obvious that prior to head removal from the pressure vessel, this segmented shield collar must be removed.

There are other forms for these shield collars. Some shields generally resemble the Permali shield. They may be formed of blocks or bags of shielding material which are stacked on platforms above the annulus and at the level of the reactor vessel head. In whatever form, the units of radiation-scattering material interfere with the removal of the pressure vessel head when gaining access to the internals of the pressure vessel.

The shield structure should be positioned in the top of the annulus so the pressure vessel head may be removed without first moving the shield. However, this position includes the problem of compensating for a loss of coolant accident (LOCA). Upon a LOCA, the buildup of pressure beneath present shield structures could create large projectiles of the shield material and possibly the reactor pressure vessel.

The problem then is to form a shield at the top of the annulus, and below the pressure vessel head, which will attenuate radiation streaming up the annulus and readily pass vapor released in the annulus during a LOCA.

SUMMARY OF THE INVENTION

The present invention provides a radiation streaming shield within the upper portion of the annulus between a nuclear pressure vessel and the reactor cavity wall.

More specifically, the invention provides the shield in the annulus in the form of annular rods of hydrogenuous material spaced from each other to provide passages for vapor from the reactor vessel and attenuation of radiation streaming up the annulus.

More specifically, the invention provides a framework of steel-sheathed, radiation - attenuation material, in the form of annular rods, placed within the upper end of the annulus. The annular rods are each provided with a cross-section of air foil shape and are horizontally spaced from each other in rows which are vertically spaced from each other. The spaces between the annular rods of each horizontal row are out of vertical register with the spaces between the annular rods of adjcent horizontal rows. All annular rods are supported by steel plates projecting from the concrete reactor cavity wall, the plates being at spaced azimuthal locations above the vessel.

Other objects, advantages and features of the invention will become apparent to one skilled in the art upon consideration of the written specifications, appended claims, and accompanying drawing.

DRAWING DESCRIPTION

FIG. 1 is a partially sectioned elevation of a reactor vessel and its concrete support structure with the streaming shield in the annulus between them and embodying the present invention; and FIG. 2 is a partially sectioned plan view of the structure of FIG. 1.

DESCRIPTION OF THE PREFERRED EMBODIMENT

Figure 1:
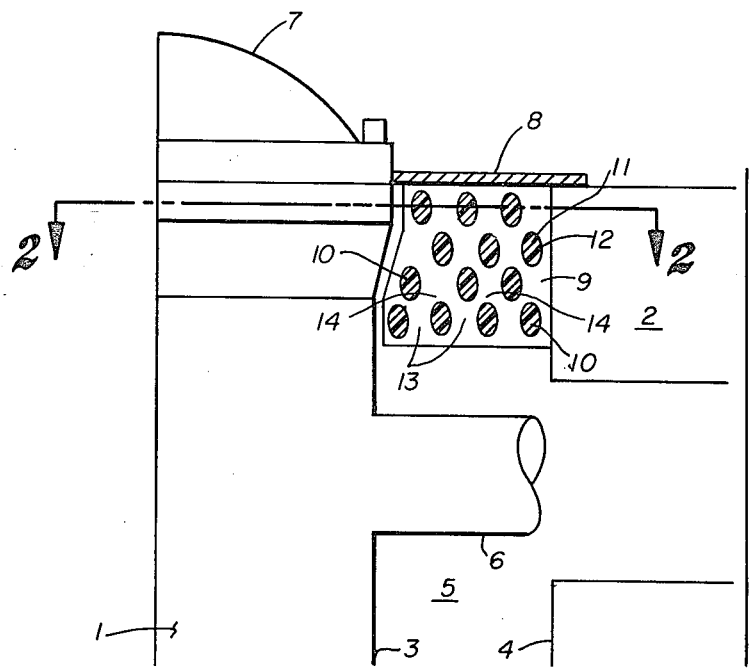

Referring specifically to FIG. 1, the upper portion of a reactor vessel is disclosed in elevation as supported within a massive concrete reactor cavity structure 2. The external wall 3 of the vessel is spaced from the concrete reactor cavity wall 4, leaving an annulus 5 of significant size.

Actually, the vessel 1 may be supported within the walls 4 from inlet and outlet 6 piping which pass water through the core of the reactor to heat the water. Only outlet piping 6 is disclosed here.

The vessel 3 has a closure 7 which bolts to the top of vessel 1. A reactor cavity seal plate 8 is positioned over the top of annulus 5 during each refueling to prevent water leakage into the annulus when the refueling pool is flooded for refueling operations. The shield structure in which the present invention is embodied is supported just below this seal plate 8.

Radiation continually streams vertically upward in the annulus 5. To protect personnel and equipment, this radiation must be attenuated. It is generally the practice to place hydrogenuous material above the annulus 5, in the general arrangement set forth in the advertisement of Permali, Inc. in the August, 1976, issue of Nuclear News. However, it can be seen from simple inspection of this advertisement, the attenuating material must be removed when it is desired to remove the closure of the top of the reactor vessel. This procedure is costly in terms of time spent in this preparation to open the vessel.

The present invention includes the concept of positioning the shield structure 9 down into the top of the annulus 5, below the level of closure 7 and seal plate 8. The shield structure 9, therefore, becomes more or less permanently located out of the way of the pressure vessel closure head 7 and reactor cavity seal plate 8.

In this art, re-location of the radiation streaming shield is not a small decision. The shields are massive in physical size. Their support at the new location generates problems. The new location also must take into account what will happen if there is a loss of coolant accident (LOCA).

If a LOCA occurs, it is quite likely there will be a release of massive amounts of steam in the annulus 5. If the shield structure 9 prevents the ready escape of this steam, a pressure buildup may occur which will make projectiles of the parts of shield structure 9 and possibly the reactor vessel itself. In short, pressure buildup in annulus 5 would be a major disaster.

The present invention contemplates forming shield 9 so that it will effectively attenuate the radiation at all times and be sufficiently porous to steam to avoid a significant build-up of pressure in the annulus 5.

Figure 2:
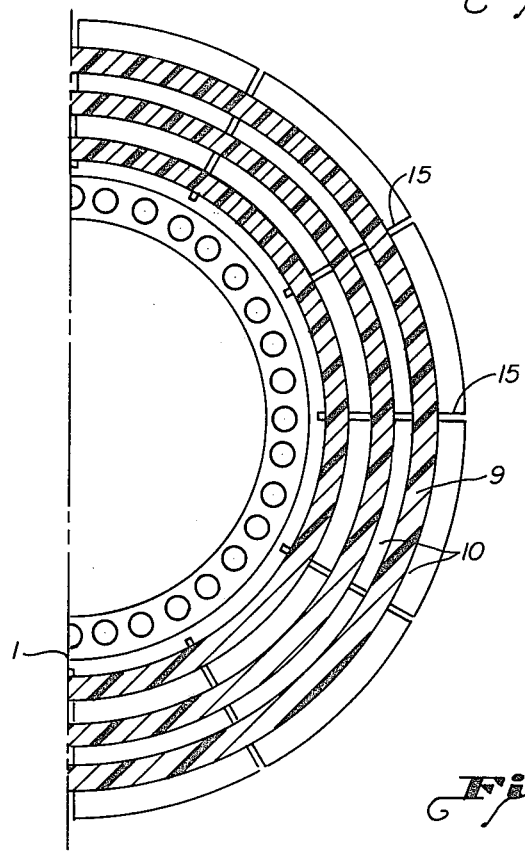

Both FIG. 1 and FIG. 2 are adequate to disclose the basic formation of shield structure so as to embody the invention. Together, they leave no doubt how the radiation is continually attenuated and vapor is vented from annulus 5 upon a LOCA.

In FIG. 1 the shield structure 9 is shown in cross-section. The shield is basically formed by a series of annular rods 10. In cross-section, the annular rods are disclosed as formed of hydrogenuous material 11. The preformed hydrogenuous material which will effectively scatter radiation is physically in a plastic form. This plastic material requires a sheath 12 of supporting and protective metal, such as steel.

Another way to look at the shield structure is to view the annular rods 10 as tubes 12 with a core 11 of hydrogenuous material. In either events, the annular tubes, or annular rods, are spaced from each other in horizontal rows and the rows are vertically spaced from each other. The spaces 13 between the lower row of annular rods 10 are arranged to be out of vertical register with spaces 14 of the row of annular rods 10 adjacent the lower row of annular rods 10. Therefore, as should now be apparent, there is no vertical line of sight from below shield 9 to above shield 9.

Next, note annular rods 10 are given an air foil shape in cross-section. This shape, together with the spaces provided between horizontally spaced annular rods 10, insures ready passage of fluids through shield 9. In effect, taking shield structure 9 as a whole, the arrangement and shape of annular rods 10 provide a shield which will effectively attenuate radiation streaming up the annulus 5 while offering little resistance to the flow of steam, or other vapor, which may result from a LOCA.

FIG. 2 provides a somewhat different perspective of the shield structure 9. The reactor vessel 7 and concrete reactor cavity structure 2 will orient the viewer. This plan view is taken from just below seal plate 8. Therefore, the upper row of annular rods 10 are exposed to view.

The basic reason for generating FIG. 2 is to disclose that shield 9 is composed of annular rods 10 but these annular rods need support to maintain them in rows and the rows spaced from each other. The support comes from steel plates 15 which are extended from the reactor cavity wall 4. These flat plates 15 are mounted from reactor cavity structure 2 in vertical planes and are at spaced azimuthal locations about the reactor vessel. Holes are provided for the annular rods 10 which are thus maintained in the spaced relationship which insure continual attenuation of radiation and flow of fluid through the seal.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A radiation shield for a nuclear reactor vessel, including,
   a reactor pressure vessel in the form of a vertical cylinder,
   a concrete reactor cavity structure spaced about the external wall of the pressure vessel,
   a series of rings of hydrogeneous material spaced from each other and mounted in the annulus between the vessel and reactor cavity structure to avoid any upward and straight and vertical line of sight in the annulus from below the rings,
   whereby radiation streaming up the annulus from below the rings will be attenuated while a loss of coolant accident will result in a minimal pressure buildup in the annulus.

2. The shield of claim 1 including,
   steel plates are extended from the concrete reactor cavity structure and across the annulus in support of the rings of hydrogeneous material.

3. The shield of claim 1 in which,
   the rings of hydrogeneous material are each provided with a sheath of steel for support of the material.

4. The shield of claim 3 in which,
   the rings are of airfoil form in cross-section and spaced from each other in staggered rows to avoid the upward and straight and vertical line of sight in the annulus from below the rings.

5. The shield of claim 1, wherein,
   the rings are arranged and supported as a unit below the top of the reactor vessel.

6. A radiation shield positioned in the cavity annulus between a cylindrical nuclear reactor vessel and the surrounding walls of a concrete reactor cavity structure to attenuate radiation streaming up the cavity annulus while providing minimal pressure buildup following a loss of coolant accident below the shield, including,
   a collection of rings of hydrogeneous material spaced horizontally in rows and the rows spaced vertically from each other with the horizontal spaces between the rings of each row out of vertical register with the horizontal spaces of adjacent rows to obviate all vertical line of sight in the cavity annulus from below the collection,
   and structure extending from the concrete reactor cavity structure to fix, the rings in their individually spaced positions and their collective position below the upper end of the vessel.

7. The shield of claim 6 in which,
   each ring of hydrogeneous material is provided with an outer sheath of steel.

8. The shield of claim 7 in which,
   the cross-section of each ring is fabricated to the form of an airfoil.

9. The shield of claim 6 in which the structure extending from the concrete reactor cavity support structure is in the form of a series of steel plates extended across the cavity annulus at spaced azimuthal locations.

* * * * *